United States Patent
Dunn et al.

(10) Patent No.: US 10,187,573 B2
(45) Date of Patent: Jan. 22, 2019

(54) CAMERA VOICE COIL MOTOR DRIVER CIRCUIT WITH VARIABLE POWER SUPPLY INPUT VOLTAGE

(71) Applicant: Apple Inc., Cupertino, CA (US)

(72) Inventors: Ryan J. Dunn, San Francisco, CA (US); Damien J. Thivent, Santa Clara, CA (US); Morgan T. McClure, San Francisco, CA (US); Parin Patel, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/798,005

(22) Filed: Jul. 13, 2015

(65) Prior Publication Data

US 2017/0019596 A1 Jan. 19, 2017

(51) Int. Cl.
*H04N 5/228* (2006.01)
*H04N 5/232* (2006.01)

(52) U.S. Cl.
CPC ....... *H04N 5/23241* (2013.01); *H04N 5/2328* (2013.01); *H04N 5/23212* (2013.01); *H04N 5/23293* (2013.01)

(58) Field of Classification Search
CPC ........... H04N 5/23241; H04N 5/23293; H04N 5/23212; H04N 5/2328

USPC .............. 348/208.99, 208.1–208.8, 372–376
See application file for complete search history.

(56) References Cited

U.S. PATENT DOCUMENTS

| | | | |
|---|---|---|---|
| 5,701,521 A * | 12/1997 | Ohishi | G03B 5/00 396/52 |
| 5,781,362 A | 7/1998 | Bang | |
| 8,189,280 B2 | 5/2012 | Ollila et al. | |
| 8,724,016 B2 | 5/2014 | Tsai | |
| 2008/0151065 A1 * | 6/2008 | Okumura | H04N 5/2253 348/208.4 |
| 2009/0295978 A1 * | 12/2009 | Yun | H04N 5/2251 348/335 |
| 2009/0316010 A1 * | 12/2009 | Nomura | G03B 5/00 348/208.6 |

* cited by examiner

*Primary Examiner* — Yogesh Aggarwal
(74) *Attorney, Agent, or Firm* — Womble Bond Dickinson (US) LLP

(57) ABSTRACT

In a portable camera device, a variable voltage regulator produces a power supply voltage of a VCM driver circuit that conducts the coil current of a VCM actuator as part of an optical image stabilization (OIS) mechanism. A processor signals the variable voltage regulator to increase the power supply voltage when the camera device transitions from still capture mode or preview mode to video capture mode, where the increase causes an increase in stroke of the VCM OIS actuator. Other embodiments are also described and claimed.

20 Claims, 5 Drawing Sheets

CAMERA VOICE COIL MOTOR DRIVER CIRCUIT WITH VARIABLE POWER SUPPLY INPUT VOLTAGE

An embodiment of the invention relates to portable camera devices such as smartphones, tablet computers, and other devices in which heat sensitive elements have been tightly packaged. More particularly, an embodiment of the invention is directed to techniques for thermal mitigation within a camera module having an optical image stabilization (OIS) voice coil motor (VCM) actuator. Other embodiments are also described and claimed.

BACKGROUND

An optical image stabilization (OIS) actuator of a portable camera device (such as a smartphone, a tablet computer or a camcorder) can operate in different camera operation modes, including preview (viewfinder) mode, still capture mode, and video capture mode. Typically, the actuator contains a voice coil motor (VCM) that is driven by a VCM driver (circuit). The power supply input voltage of the driver is selected to be large enough as to enable the driver to source its maximum output current (Imax). Imax is what the driver should be able to source into the VCM, during the most demanding operating mode, which may be the operating mode in which the greatest stroke (or movement amplitude) is required from the actuator, e.g. video capture mode in the presence of high vibration.

SUMMARY

It has been found that a conventional VCM driver of a VCM-based OIS actuator may produce too much heat, due to excessive power consumption during low output current conditions. When the driver is housed in the cramped environment of a portable device such as a smartphone or a tablet computer, an undesirable thermal condition may appear at the VCM driver that affects other heat sensitive components that are located nearby.

It has also been found that the VCM driver of a smartphone or tablet computer spends the majority of its time (during normal end user or in-the-field usage) driving less than 50% of its maximum output current. This may be when the camera device is operating mostly in its preview and still capture modes, where the OIS actuator only has light duties. Only occasionally will the OIS actuator be tasked to produce anything close to 100% of its maximum output current, namely when trying to reduce motion blur when in video capture mode and while the portable device is experiencing strong vibration. Also, most video sessions last a relatively short period of time.

An embodiment of the invention is a process for operating a VCM driver circuit of a camera OIS actuator in a camera device, to improve power efficiency and therefore reduce heat generation by the driver. The power supply input voltage of the driver is varied, as opposed to being kept fixed, based on an indication of a level of activity or performance expected of the OIS actuator. When the indication is that the level of activity of the OIS actuator is expected to be high, the power supply input voltage is raised. When the indication is that the level of activity of the OIS actuator is to be low, the power supply input voltage is lowered. Such a process may advantageously result in the headroom of the driver (the voltage drop across the driver, e.g. the voltage between its power supply input and its output or VCM node) remaining as small as practical during times of low output current, such as during preview and still capture modes of the camera device. This helps improve efficiency and reduces heat generation by the driver during long usage intervals, which may especially help avoid thermal conditions near the VCM driver, especially in tightly packaged portable camera devices such as smartphones and tablet computers.

Another embodiment of a process for operating a driver circuit of a camera OIS actuator in a camera device is referred to as an on-the-fly embodiment. The power supply input voltage of the driver is continuously varied once the camera device is powered on (e.g., once a camera application is launched, in a multi-function device), as a function of the performance demanded from the OIS actuator. This may result in the headroom of the driver being varied continuously and kept at its lowest practical level, in view of the performance asked of the OIS actuator. Several input variables can be used by the processor in this embodiment, when it is deciding how to vary the power supply input voltage of the driver on-the-fly. These include not just an indication of the present capture mode (e.g., preview, still/slow capture, or video capture) but also the detected user context or how the camera device is being used (e.g., attached to a tripod, hand held while standing still, hand held while walking, helmet mount, and driving). The detected user context may be based on output data of one or more sensors in the camera device, e.g. a position, orientation or movement sensor such as an accelerometer or a gyroscope.

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one. Also, a given figure may be used to illustrate the features of more than one embodiment of the invention, and not all elements in the figure may be required for a given embodiment.

DETAILED DESCRIPTION

Several embodiments of the invention with reference to the appended drawings are now explained. Whenever aspects of the embodiments described here are not clearly defined, the scope of the invention is not limited only to the parts shown, which are meant merely for the purpose of illustration. Also, while numerous details are set forth, it is understood that some embodiments of the invention may be practiced without these details. In other instances, well-known circuits, structures, and techniques have not been shown in detail so as not to obscure the understanding of this description.

Figure 1:
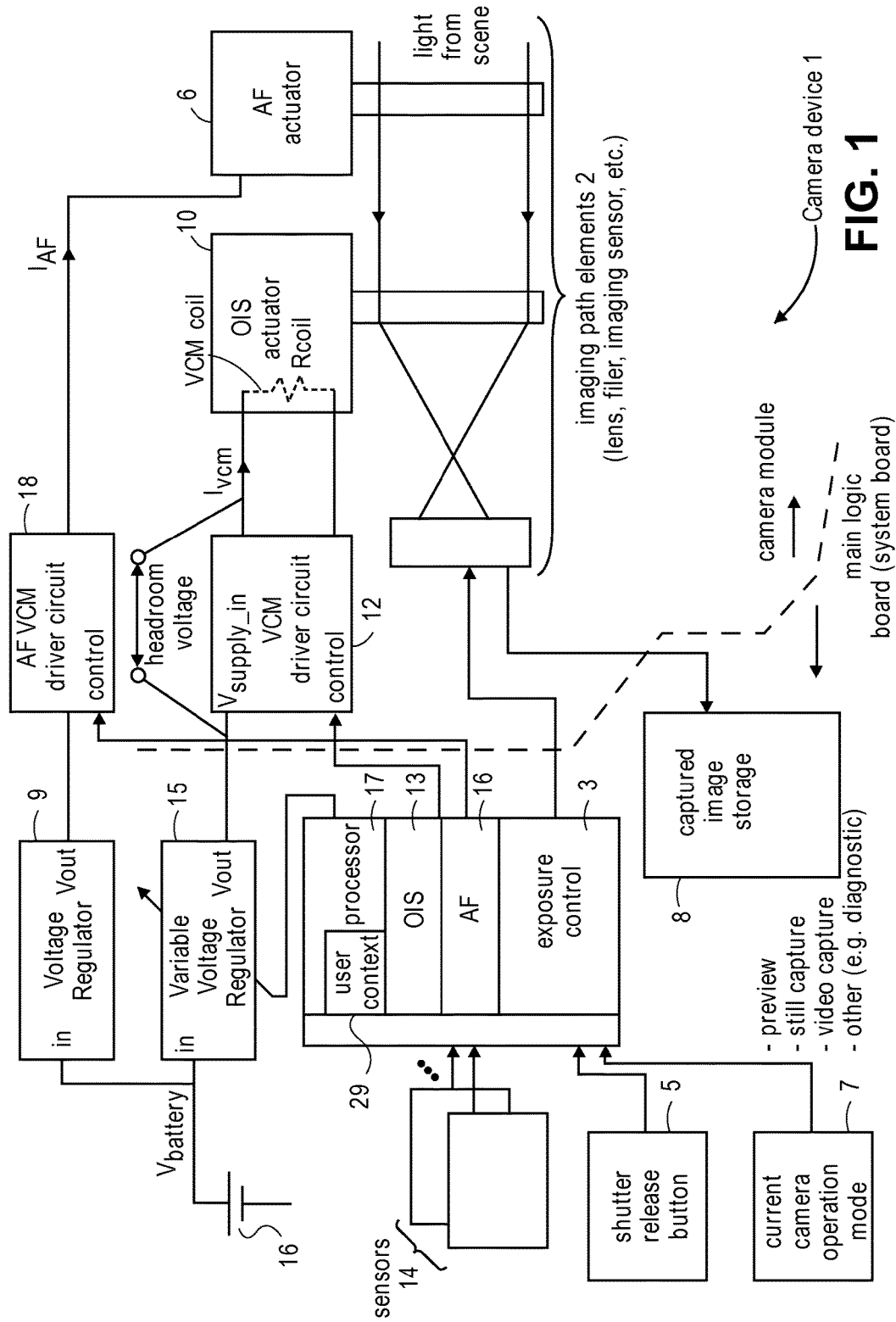
FIG. 1 is a block diagram of a camera device.
Figure 6:
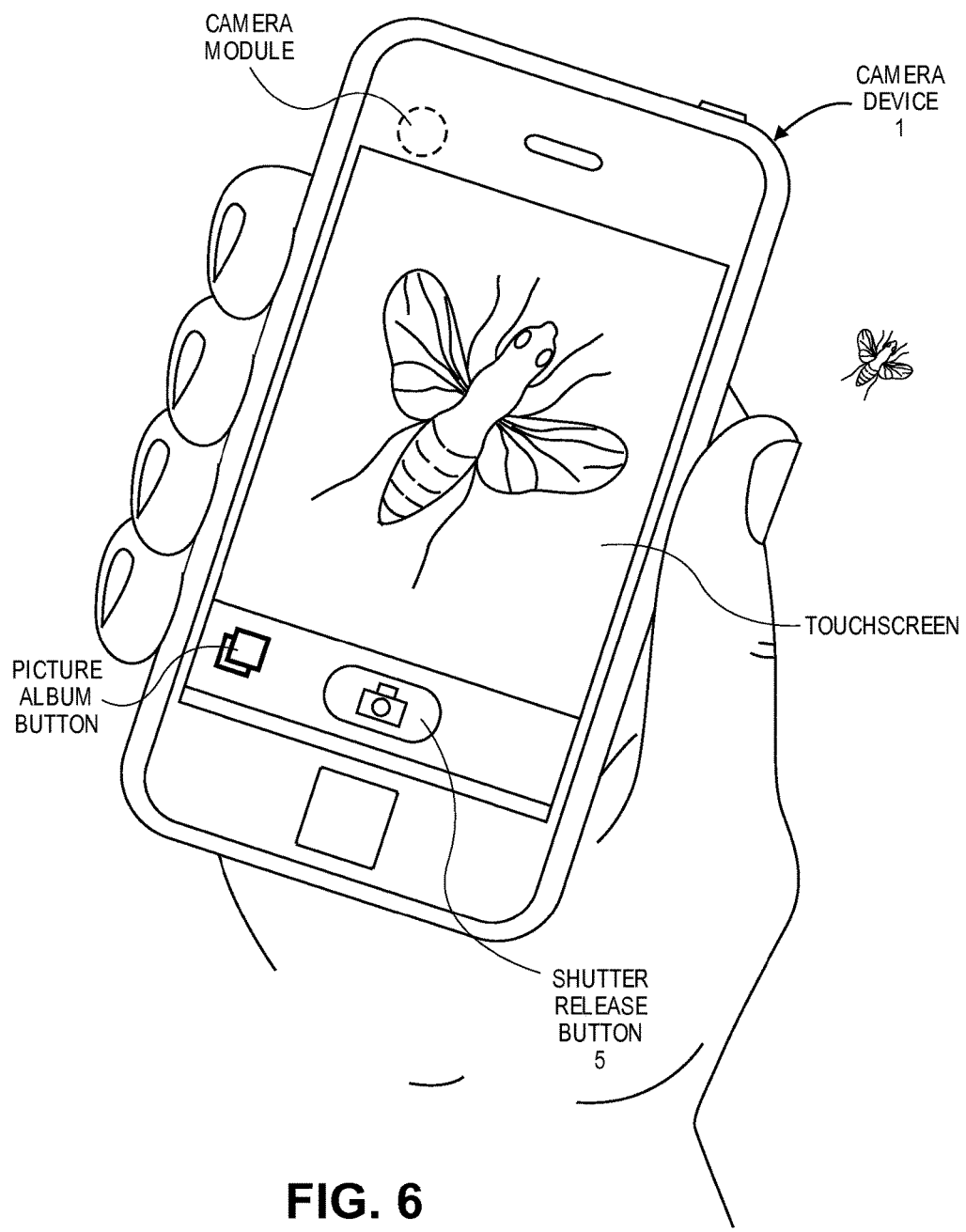
FIG. 6 depicts an example camera device, being a smartphone.

FIG. 1 is a block diagram of a camera device 1. Only relevant components of the camera device are shown. The camera device may be, for example, any portable consumer electronics device that has a camera function built in together with OIS capability (e.g., a smartphone as illustrated in FIG. 6, a tablet computer, or a wearable or mountable camcorder). Light from a scene is directed through a number of imaging path elements 2 that may include an imaging lens system including an autofocus subsystem, any suitable filter (e.g., an antireflection filter), and, of course, an imaging sensor such as a solid state color sensor. The light from the scene arrives at the imaging sensor which in response produces a digital, captured image of the scene. Captured images are stored within storage 8 (e.g., any suitable solid state microelectronic memory for example) as part of a still image file or a video capture file. The imaging sensor has various capture control parameters that are set by an exposure control unit 3 which may include exposure time (or integration time), strobe (flash) control, pixel signal gain, and other control variables that are responsible for how each image is obtained and then stored in the storage 8. The exposure control unit 3 responds to a shutter release button 5, which may be a virtual or physical button (virtual in the sense of, for example, a button that is made available to the user through a touchscreen—see FIG. 6).

A current camera operation mode data structure 7 defines the current operating mode or capture mode. The data structure 7 contains a stored variable that identifies the current camera operation mode, which mode may be selected by a user of the camera device 1. Examples include real-time preview mode in which a live video of the scene is captured and displayed to the user to allow the user to evaluate the scene (before deciding to actually perform a still or video capture session by selecting the shutter release button 5), a still capture mode in which, upon actuation of the shutter release button 5, a still image is produced and written to the storage 8, and video capture where, in response to the shutter release button 5 being selected by the user, a video file of the scene is created and stored. Yet another camera operation mode may be a diagnostic mode in which, for example, the OIS functionality of the camera device is tested (as further discussed below). Other camera operation modes are possible, including a slow motion capture mode that has a lower frame rate than video capture.

The camera device 1 depicted in FIG. 1 also has an OIS actuator 10 that is coupled to move one or more of the imaging path elements 2 so as to achieve optical image stabilization, to help reduce motion blur in the captured image. The stroke of the OIS actuator 10 may, for example, be a tilt of a lens, or a translation movement of a filter, or a tilt or translation of the imaging sensor or of the entire camera module itself. The OIS actuator 10 may contain a VCM whose VCM coil is depicted by a parasitic resistance Rcoil representing the resistance of one or more coils of wire that are used in a typical VCM to generate the magnetic field (as part of the electro-magnetic machine). A coil current $I_{vcm}$ is drawn by the VCM coil, to effect the stroke or movement upon an imaging path element (where the relationship between Ivcm and the stroke may be generally linear).

The coil current is drawn from or sunk by, and is limited by, a VCM driver circuit 12. The latter may be any suitable linear or switch mode current driver circuit that has a control input which receives a command that may translate (by the VCM driver circuit 12) into an average current level in $I_{vcm}$. The control signal input or command to the VCM driver circuit 12 may represent a stroke amount of the OIS actuator 10, e.g. up to 200 microns for example. The command given to the VCM driver circuit 12 is calculated by an OIS processor 13 which may be performing any conventional or otherwise suitable OIS algorithm, which may use as input variables data obtained by one or more sensors 14, including an inertial sensor such as a multi axis accelerometer. Briefly, the OIS algorithm evaluates the sensor data and attempts to compensate for the movement of the camera device 1 (as reflected in the sensor data) by calculating an appropriate stroke amount that is applied to the control input of the VCM driver circuit 12, which in turn translates the command into an output current level in $I_{vcm}$. This is intended to achieve the desired stroke by the OIS actuator 10, in response to the appropriate amount of $I_{vcm}$ being driven into the VCM coil, so that the optical image produced on the imaging sensor exhibits less jitter (thereby resulting in less motion blur in the captured still file or video file).

The VCM driver circuit 12 has a power supply input ($V_{supply\_in}$) from which $I_{vcm}$ is drawn and which is provided by a variable voltage regulator 15. The regulator 15 may be a dc-to-dc power converter, and may be a linear voltage regulator or it may be a switch mode power supply (SMPS) regulator. The power conversion may be step down or it may be step up, depending upon the available input dc voltage to the regulator 15. In one embodiment, this input voltage is a battery voltage $V_{battery}$ that is provided by a battery 16, such as a rechargeable battery. In another embodiment, the camera imaging path element 2, the OIS actuator 10, and the driver circuit 12 are integrated within a camera module that is separate from a main logic board on which the variable voltage regulator 15 is installed.

As explained above in the Background section, in a typical system, $V_{supply\_in}$ of the VCM driver circuit 12 receives a fixed, regulated dc voltage that is selected to be sufficiently high so as to produce, or rather enable the VCM driver circuit 12 to produce, the maximum output current $I_{vcm}$ through a known resistance Rcoil, that will be needed to achieve the stroke needed by the OIS actuator 10, in the worst case scenario (for example, strong vibration during video capture mode). That typical solution, however, may create too much heat due to excessive power consumption by the VCM driver circuit 12 caused by excessive headroom (a large voltage drop from $V_{supply\_in}$ to the output VCM coil node of the driver 12), during low output current conditions (when $I_{vcm}$ is low or small, such as when the OIS actuator 10 has low activity or low performance, meaning that its requested stroke is small compared to the stroke needed in the worst case scenario). The problem is especially acute when the driver circuit 12 is housed in the cramped environment of a portable device such as a smartphone or a tablet computer, or even a wearable or mountable camcorder, where an undesirable thermal condition may appear at the driver circuit 12 that effects other heat sensitive components which are located nearby, including for example one of the sensors 14.

To address that problem, the voltage regulator 15 is made to be variable in that its output voltage Vout can be varied continuously, or over a range of discrete values, by a processor 17, in order to reduce the headroom or voltage drop across the driver circuit 12, between its power supply input $V_{supply\_in}$ and its output (VCM coil) node. Keeping that voltage drop or headroom across the driver circuit 12 to a minimum (the minimum needed to yield the desired, level of $I_{vcm}$, based on the resistance Rcoil and the desired, stroke that may be demanded from the OIS actuator 10) is an advantageous process. The process may advantageously result in the headroom (the voltage drop across the driver, e.g. the voltage between its power supply input and its output VCM coil node) remaining as small as practical during times of low output current, such as during preview and still capture modes of the camera device. This helps improve efficiency and reduces heat generation by the driver 12 during long usage intervals in which the camera device 1 finds itself in the preview and still capture modes, which in turn may especially help avoid thermal conditions near the VCM driver in tightly packaged portable camera devices such as smartphones and tablet computers.

Figure 2:
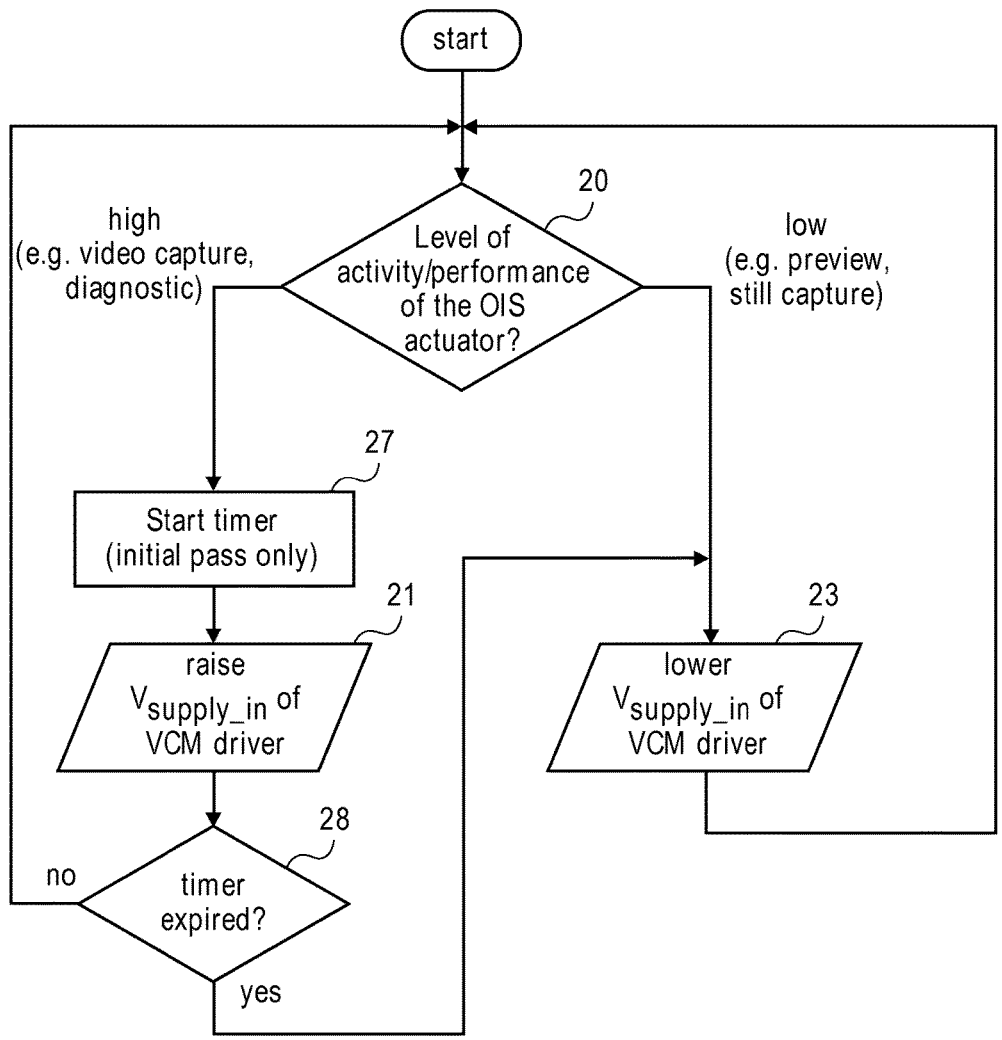
FIG. 2 is a flow diagram of a method performed by a processor and associated circuitry, to obtain improved power efficiency and reduced heat generation in a camera device having OIS capability.

Turning now to FIG. 2, a flow diagram of a process performed by the processor 17 (see FIG. 1) for operating the driver circuit 12 of the camera OIS actuator 10 is shown. As suggested above, this process may improve power efficiency within the driver circuit 12, and therefore reduce heat generation by the driver circuit 12, thereby helping prevent thermal conditions that may adversely effect nearby components, for example one or more of the sensors 14 within the same main housing of the camera device 1. Operation begins with making a determination about the level of activity or performance of the OIS actuator (block 20). If a low level of activity or performance is indicated or expected, then $V_{supply\_in}$ of the VCM driver circuit 12 is lowered (block 23). The processor 17 may achieve this by appropriately signaling (at the control input of) the variable voltage regulator 15. Operation then continues with again checking the level of activity or performance of the OIS actuator (block 20), so long as the camera device is powered on (or a camera application remains in the foreground).

Figure 3:
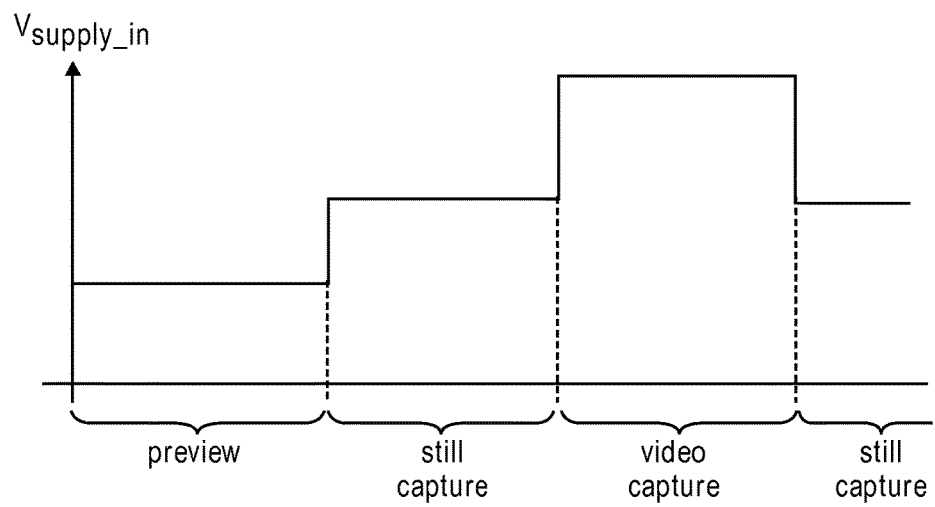
FIG. 3 is an example of how the input power supply voltage to a VCM driver circuit can vary over time as the camera device transitions between various camera operation modes.

If the indication, at block 20, is that a high level of activity or performance is expected of the OIS actuator 10, then the power supply input voltage of the VCM driver circuit 12 is raised (block 21). Note that while FIG. 2 shows another embodiment where a timer is used (blocks 27 and 28), this is an optional scenario that is only included in FIG. 2 in the interest of conciseness to reduce the number of figures. The process may take place without the use of the timer mentioned in blocks 27, 28. Where no timer is applied, the process flow following block 21 repeats with block 20 where the level of activity or performance of the OIS actuator is again checked. The process thus repeats so long as the camera device remains powered on. An example of the variation in the power supply input voltage of the driver circuit (resulting from the process of FIG. 2) is shown in FIG. 3 (and explained further below). There, it can be seen how $V_{supply\_in}$ varies as a function of changing levels of activity/performance of the OIS actuator.

The high performance level (e.g., long stroke) means that the driver's output current (that is to be sourced into, or sunk from, the VCM coil of the OIS actuator) has to be high enough to achieve long stroke by the OIS actuator. In that case, the power supply input voltage is raised to a level that provides enough headroom for the driver to provide such high output current. The low performance level (e.g., short stroke) is an activity level that is lower than the high level of activity, and as such has a lower output current (through the known resistance Rcoil). In that case, and in one embodiment, the power supply input voltage is lowered all the way down to a level that just provides enough headroom for the driver to produce the low output current, just enough to achieve a short stroke by the OIS actuator.

In one embodiment, the indication of performance level, which sets the power supply input voltage of the driver 12, is the present capture mode of the camera device. For example, the indication may be one of only two possibilities, namely 1) preview mode or still capture mode (a low performance level for the OIS actuator) and 2) video capture mode (a high performance level for the OIS actuator). In another example, the indication may be one of more than two possibilities, e.g. splitting preview and still capture into two different performance levels, to yield a total of three different performance levels (corresponding to three different $V_{supply\_in}$ levels as shown in FIG. 3). In another embodiment, a further possibility may be a middle performance level used in slow motion capture mode, which may have a lower frame rate than a full video mode and may thus only need a "medium" stroke from the OIS actuator.

A further possibility for the indication may be a camera diagnostic mode in which the maximum possible stroke is needed from the OIS actuator (where the maximum possible stroke is greater than the long stroke used in the video capture mode and would therefore need a higher power supply input voltage at the driver 12); in the diagnostic mode, the OIS actuator is commanded to its maximum possible stroke which is used to verify the mechanicals of the OIS actuator, e.g. whether or not the end stops of the OIS actuator remain in their factory set positions, linearity of the actuator, and sensitivity of the actuator. The diagnostic mode may be entered automatically, e.g. in response to a sensor-based detection of a physical shock to the device, such as when a user drops the camera device and it hits the ground.

Turning to FIG. 3, this is an example of how $V_{supply\_in}$ varies as a function of the changing indication (of the OIS actuator's performance level). Operation may begin with the camera device in preview mode, which, if used as the indication, may translate to a low level of activity or performance for the OIS actuator 10. Thus, $V_{supply\_in}$ in that case is at the lowest voltage that may be available while still enabling the OIS actuator (via its VCM driver) to operate and achieve some (albeit reduced) level of image stabilization and motion blur reduction. Next, there is a transition from preview into still capture mode when, for example, the user selects the still mode, and then on to video capture mode. These modes may be reflected within a data structure (e.g., current camera operation mode data structure 7 depicted in FIG. 1). This illustrates the result of the processor 17 signaling the control input of the variable voltage regulator 15 so as to increase the level of the power supply voltage when the camera device transitions from still capture mode to video capture mode. The increase in the level of $V_{supply\_in}$ causes an increase in stroke of the OIS actuator 10 as expected. Once the video capture session has been completed and the user at that point decides to return to still capture mode, FIG. 3 illustrates the result of the processor 17 decreasing the level of $V_{supply\_in}$, when transitioning from the video capture mode to the still capture mode or down to the preview mode, which, of course, decreases the stroke of the VCM actuator 10.

Figure 4:
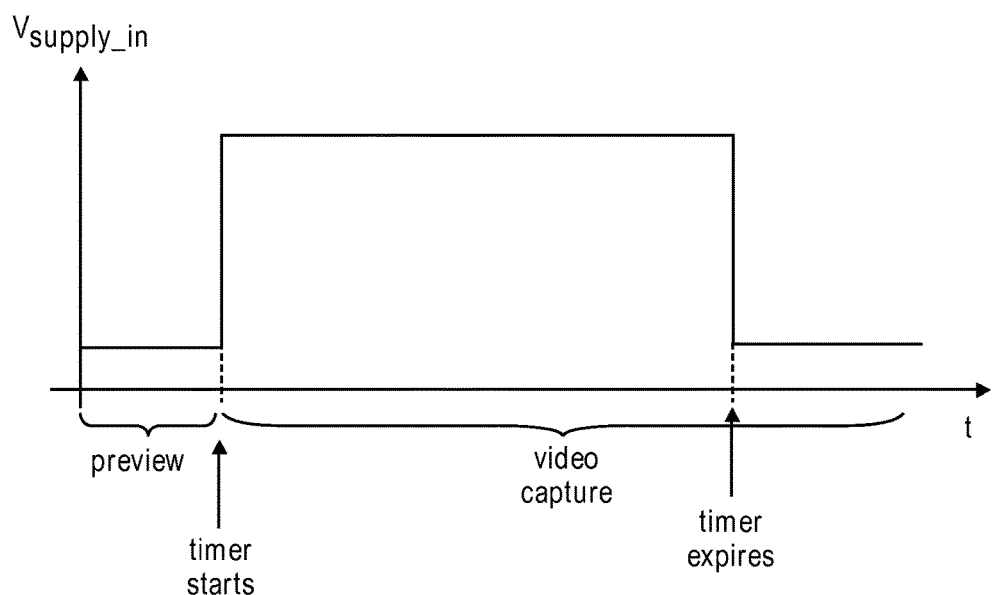
FIG. 4 is another waveform that represents the variation in the power supply input voltage of the VCM driver as a function of a timer that runs during a video capture session.

In a further embodiment, referring back to FIG. 2, a timer is started by the processor 17 (block 27) upon the start of a video capture session (when the user has manually actuated a physical or virtual shutter release button 5). FIG. 2 shows the process modified in the case where the timer is used, where the timer is started or reset upon the initial pass only, that is upon initially entering video capture mode at the start of a video capture session (block 27). The duration of the timer may be previously determined in a laboratory setting, as the central tendency of previously measured statistics on the duration of video capture sessions by users of the camera device 1. While the timer remains unexpired (block 28), the power supply input voltage of the driver 12 is allowed to remain at its high level, to enable high performance by the OIS actuator 10. However upon expiration of the timer, the power supply input voltage of the driver is lowered (block 23). That will limit the OIS actuator to low performance in order to perform thermal mitigation, even while the video capture session continues. The results of this process upon $V_{supply\_in}$ is shown in the example waveform of FIG. 4. In that case, a trade off occurs going forward with the video capture session (following expiration of the timer), between a) thermal mitigation and b) lowered OIS actuator performance (and thus likely more blur in the captured video). In other words, it is possible that the video capture session continues even after the timer expires, such that the video capture session after the expiration of the timer will have to use a lower $V_{supply\_in}$ for the VCM driver circuit 12 (and therefore will have to make do with a reduced stroke from the OIS actuator 10).

Another embodiment of a process for operating a driver circuit of a camera OIS actuator in a camera device is referred to as an on-the-fly embodiment. The power supply input voltage of the driver 12 in that case is continuously varied once the camera device is powered on (e.g., once a camera application is launched, in a multi-function device), as a function of the performance demanded from the OIS actuator. This may result in the headroom of the driver being varied continuously and kept at its lowest practical level, in view of the performance asked of the OIS actuator. Referring back to FIG. 1, several input variables can be used by the processor 17 in this embodiment, when it is deciding how to vary the power supply input voltage of the driver 12 on-the-fly. These include not just an indication of the present capture mode (e.g., preview, still/slow capture, or video capture as reflected in the data structure 7) but also a detected user context 29. The latter refers to how the camera device is being used (e.g., attached to a tripod, hand held while standing still, hand held while walking, head or helmet mounted, and driving). The detected user context 29 may be based on output data of one or more of the sensors 14 in the camera device 1, e.g. a position, orientation or movement sensor such as an accelerometer or a gyroscope.

Figure 5:
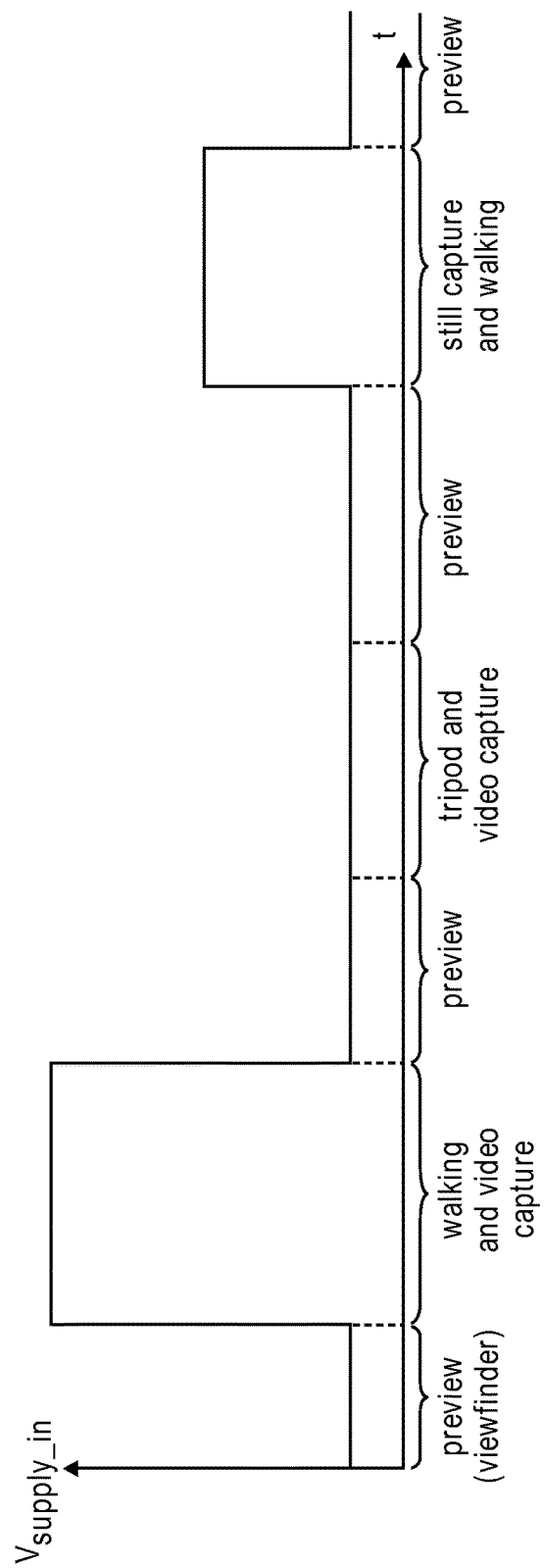
FIG. 5 is another example waveform of the power supply input voltage of the VCM driver, showing on-the-fly variation over time as a function of both user context and camera operating mode.

Referring now to FIG. 5, this is an example waveform of the power supply input voltage $V_{supply\_in}$ of the VCM driver 12, showing on-the-fly variation over time as a function of both detected user context and present camera operating mode. This may be used to illustrate how the power supply input voltage is modulated or altered at all times while the camera device 1, being in this case a portable consumer electronics device, is powered up, generally as a function of a present performance level demanded from the OIS actuator 10. More particularly, however, the changes to the power supply voltage coincide with the combination of user context and camera operating mode as shown. For example, operation begins with the camera device being in preview mode, followed by the user switching to video capture and starting to walk. In that case, the processor 17 (see FIG. 1) responds based on having accessed the data structure 7 and the detected user context, and then raises $V_{supply\_in}$ to its high level as shown. Thereafter, the user may decide to stop video capture and return to preview while still walking; in that case, the processor 17 will detect the change to preview and will immediately drop the power supply voltage down to its low level. Thereafter, the power supply voltage is maintained at the low level even though the video capture mode is selected by the user, primarily because the user context has been detected to be tripod mount. Operation then continues with reverting back to preview and then, selecting still capture (by the user) while beginning to walk. The latter causes the processor 17 to raise the power supply voltage to not a high value but a middle value (consistent with the expectation that the performance level demanded form the OIS actuator during still capture is low as compared to walking during video capture). It should also be recognized that although three different levels of the power supply voltage are shown in the example of FIG. 5, there can be finer granularity in the selection of the power supply input voltage, and there may be additional combinations of camera operating mode and user context that may trigger the various levels of finer granularity in $V_{supply\_in}$.

Returning to FIG. 2, the detected user context 29 (FIG. 1) may also be used to set (change) the duration of the timer described above, dynamically (or during in-the-field use). Recall that the timer sets the maximum period of time that the OIS actuator 10 can be used in its high performance state, during a single video capture session. For example, when the detected user context 29 is tripod, the timer can be much longer than when the detected user context 29 is walking or driving (because the thermal condition is not likely to appear during tripod, due to essentially no OIS actuator activity when the camera device 1 is being held completely still by the tripod).

Referring back to FIG. 1, yet another embodiment of the invention is illustrated in this figure. In such an embodiment, the camera device 1 is fitted with an autofocus actuator 6 which is coupled to one of the camera imaging path elements 2 (e.g., an autofocus lens subsystem). An autofocus driver circuit 18 (AF VCM driver circuit) has an output that conducts the current of the autofocus actuator, $I_{AF}$. A separate voltage regulator 9 has an output Vout that produces a further power supply voltage at a power supply input of the AF VCM driver circuit 18 as shown. In other words, the power supply input of the VCM driver circuit 12 (for the OIS actuator) is controlled separately from the power supply input of the AF VCM driver circuit 18. Operation of the autofocus mechanism in FIG. 1 may be conventional, including the use of an autofocus (AF) processor 16 which performs any suitable autofocus algorithm in order to position a focusing lens subsystem within the imaging path elements 2, by generating a suitable control signal to the AF VCM driver circuit 18, where the latter translates the control input into a previously determined average current level in $I_{AF}$, in order to achieve the desired stroke from the AF actuator 6.

While certain embodiments have been described and shown in the accompanying drawings, it is to be understood that such embodiments are merely illustrative of and not restrictive on the broad invention, and that the invention is not limited to the specific constructions and arrangements shown and described, since various other modifications may occur to those of ordinary skill in the art. For example, although FIG. 1 depicts an arrow for $I_{vcm}$ that is directed from the VCM driver 12 to the OIS actuator's VCM coil, an alternative is for the arrow to be directed in the reverse direction. The latter represents the case where the VCM driver 12 is sinking $I_{vcm}$ from one end of the VCM coil. In that case the power supply input ($V_{supply\_in}$) could be connected directly to the other end of the VCM coil. The description is thus to be regarded as illustrative instead of limiting.

What is claimed is:

1. A method for operating a driver circuit of a camera OIS actuator, comprising:
   determining an indication or expectation of a level of activity of a camera OIS actuator operating in an operating mode in which captured images are produced; and
   setting a power supply input voltage of a driver of the OIS actuator, based on said indication or expectation, and
   applying the power supply input voltage based on said indication or expectation, to power the driver while driving the OIS actuator during operation in the operating mode in which captured images are produced,
      wherein when the indication or expectation is that the level of activity of the OIS actuator is a first activity level, the power supply input voltage is set to a first power supply level and the driver is powered at the first power supply level to drive the OIS actuator while captured images are produced, and
      when the indication or expectation is that the level of activity of the OIS actuator at a second activity level that is lower than the first activity level, the power supply input voltage is set to a second power supply level that is lower than the first power supply level and the driver is powered at the second power supply level to drive the OIS actuator while captured images are produced.

2. The method of claim 1 wherein determining an indication or expectation of a level of activity of an OIS actuator comprises:
   accessing a stored variable that identifies a current mode of operation of a camera device of which the OIS actuator and the driver are a part,
   wherein the indication or expectation of the level of activity of the OIS actuator is the second activity level, in response to the current mode of operation being preview mode or still capture mode,
   and wherein the indication or expectation is the first level of activity in response to the current mode of operation being video capture mode.

3. The method of claim 1 further comprising:
   starting a timer when a video capture session begins;
   while the timer remains unexpired, maintaining the power supply input voltage of the driver at the first power supply level, to enable a high level of activity by the OIS actuator; and
   in response to expiration of the timer, lowering the power supply input voltage of the driver to limit the OIS actuator to a low level of activity that is lower than the high level of activity, even while the video capture session continues.

4. The method of claim 3 further comprising:
   detecting user context of a camera device, wherein the user context is one of a) attached to a tripod, b) walking, c) head or helmet mounted, or d) driving; and
   setting a duration of the timer in accordance with the detected user context.

5. The method of claim 1 wherein determining an indication or expectation of a level of activity of an OIS actuator comprises:
   accessing a stored variable that identifies a current mode of operation of a camera device of which the OIS actuator and the driver are a part, and
   wherein the indication or expectation of the level of activity of the OIS actuator is a maximum level of activity in response to the current mode of operation being camera diagnostic mode.

6. The method of claim 1 wherein determining an indication or expectation of a level of activity of a camera OIS actuator comprises using a current operating mode and a user context, to determine the indication or expectation of the level of activity of the camera OIS actuator.

7. The method of claim 6 wherein the current operating mode is any one of video capture, still capture and preview.

8. The method of claim 6 wherein the user context is one of a) attached to a tripod, b) walking, c) head or helmet mounted, or d) driving.

9. A portable camera device comprising:
   a camera imaging path element;
   a voice coil motor (VCM) actuator coupled to move the camera imaging path element while drawing a coil current;
   an VCM driver circuit having an output to conduct the coil current, a power supply input, and a control input to set a level of the coil current;
   an optical image stabilization (OIS) processor that is signal the control input of the driver circuit to move the camera imaging path element for OIS;
   a variable voltage regulator having an output that is to produce a power supply voltage and is coupled to the power supply input of the driver circuit, and a control input to vary a level of the power supply voltage; and
   a processor to signal the control input of the variable voltage regulator to increase the level of the power supply voltage when the camera device transitions from still capture mode or preview mode to video capture mode, wherein an increase in the level of the power supply voltage causes an increase in stroke of the VCM actuator.

10. The portable camera device of claim 9 wherein the processor is to decrease the level of the power supply voltage when transitioning from the video capture mode to the still capture or to the preview mode, which decreases stroke of the VCM actuator.

11. The portable camera device of claim 9 wherein the camera imaging path element, the OIS actuator, and the driver circuit are integrated within a camera module that is separate from a main logic board on which the variable voltage regulator is installed.

12. The portable camera device of claim 9 further comprising:
   an autofocus actuator coupled to the camera imaging path element;
   an autofocus driver circuit having an output to conduct current of the autofocus actuator; and
   a further voltage regulator having an output that is to produce a further power supply voltage at a power supply input of the autofocus driver, wherein the power supply input of the VCM driver circuit is controlled separately from the power supply input of the autofocus driver circuit.

13. A camera device comprising:
   a camera imaging path element;
   an optical image stabilization (OIS) actuator having a voice coil motor (VCM) coupled to actuate the camera imaging path element while drawing a coil current;

a driver circuit having an output to conduct the coil current of the VCM, a power supply input, and a control input to set a level of the coil current;

a variable voltage regulator having an output to produce a power supply voltage and being coupled to the power supply input of the driver circuit, and a control input to vary a level of the power supply voltage; and a processor coupled to the control input of the variable voltage regulator to modulate the power supply voltage at the power supply input of the driver circuit, at all times while the camera device is powered up, as a function of a present performance level demanded from the OIS actuator.

14. The device of claim 13 wherein the processor is to modulate the power supply voltage of the driver circuit in response to detecting a present user context in which the camera device is being used.

15. The device of claim 13 wherein the processor modulates the power supply voltage such that headroom of the driver circuit is varied continuously and is kept at a lowest level that meets a current performance level demanded from the OIS actuator.

16. The device of claim 13 wherein the processor is to modulate the power supply voltage based on a plurality of input variables that include a) an indication of the present capture mode of the camera device and b) a present user context.

17. The device of claim 16 further comprising a sensor whose output data is used by the processor to detect the present user context in which the camera device is being used, wherein the present user context is one of walking, running, driving, or tripod.

18. The device of claim 13 further comprising:

an autofocus actuator coupled to the camera imaging path element, or to another camera imaging path element;

an autofocus driver circuit having an output to conduct current of the autofocus actuator; and a further voltage regulator having an output that is to produce a further power supply voltage and is coupled to a power supply input of the autofocus driver, such that the power supply input of the OIS driver circuit can be controlled separately than the power supply input of the autofocus driver circuit.

19. The device of claim 13 wherein the present performance level demanded from the OIS actuator is one of low or high, and wherein the present performance level is low while the device is in preview mode and high while the device is in video capture mode.

20. The device of claim 13 wherein the present performance level demanded from the OIS actuator is one of low or high, wherein the present performance level is low while the device is in still capture mode, and high while the device is in video capture mode.

* * * * *